United States Patent [19]
Hoffman et al.

[11] 4,243,072
[45] Jan. 6, 1981

[54] THREE POSITION SELECTOR VALVE

[75] Inventors: Robert K. Hoffman; Mark A. Kavanaugh, both of Plainwell, Mich.

[73] Assignee: Parker-Hannifin Corporation, Cleveland, Ohio

[21] Appl. No.: 972,769

[22] Filed: Dec. 26, 1978

[51] Int. Cl.³ .............................................. F16K 11/20
[52] U.S. Cl. .................................. 137/637.1; 137/596
[58] Field of Search ............................ 137/637.1, 596

[56]  References Cited
U.S. PATENT DOCUMENTS

| | | | |
|---|---|---|---|
| 2,011,824 | 8/1935 | Pearson | 137/637.1 X |
| 3,215,163 | 11/1965 | Henderson | 137/625.68 |
| 3,324,888 | 6/1967 | Henderson | 137/625.68 |
| 3,373,831 | 3/1968 | Terry et al. | 137/625.21 |
| 3,979,967 | 9/1976 | Dunlap | 74/475 |

FOREIGN PATENT DOCUMENTS

| | | | |
|---|---|---|---|
| 1315037 | 12/1962 | France | 137/637.1 |
| 443527 | 3/1936 | United Kingdom | 137/637.1 |

*Primary Examiner*—Arnold Rosenthal
*Attorney, Agent, or Firm*—James A. Baker

[57]  ABSTRACT

A valve selectively supplies air pressure to two pneumatic devices on the transmission housing of a motor vehicle. The selector valve includes a stationary base mounted on the top of the gearshift lever of the vehicle. First and second valve plates are mounted for individual movement between two positions relative to the base to selectively connect and disconnect an air pressure source with the two pneumatic devices. Cooperating engaging surfaces on the first and second valve plates insure proper sequencing of the selector valve by the operator.

14 Claims, 7 Drawing Figures

THREE POSITION SELECTOR VALVE

BACKGROUND OF THE INVENTION

This invention relates to an air valve, and more particularly to a multiple position air selector valve.

Air selector valves are used on motor vehicles for selectively communicating air pressure with pneumatic devices on the transmission of the vehicle to select gear ranges for the vehicle. One prior art selector valve includes a stationary base mounted on top of the motor vehicle gearshift lever, a rotatable control button and a stationary cap. The control button is selectively rotated between three positions relative to the stationary body and cap, and a detent holds the control button in the desired one of its three positions.

One disadvantage of this prior art selector valve is that a single unidirectional movement of the control button can move the control button from its first position to its third position without stopping at the second position. This overactuation of the selector valve can cause improper sequencing of the gear ratios of the vehicle.

Other prior art rotatably movable selector valves are disclosed in U.S. Pat. Nos. 3,373,831 and 3,979,967. Prior art axially movable air selector valves are disclosed in U.S. Pat. Nos. 3,215,163 and 3,324,888.

SUMMARY OF THE INVENTION

The present invention provides a selector valve having a stationary body mounted on the top of the motor vehicle gearshift lever. The stationary body includes an air pressure supply port and two outlet ports, and the two outlet ports are each separately connected to a pneumatic device on the vehicle transmission.

A control button is rotably mounted on the stationary body for movement between two positions. In one of the positions the first outlet port is isolated from the supply port, and in the other position the first outlet port is connected to the supply port.

A cap is fitted over the control button and body and is mounted for rotational movement between two positions relative to the body and relative to the control button. The cap isolates the supply port from the second outlet port when the cap is in one position and connects the supply port with the second outlet port when the cap is in its other position.

Cooperating engaging surfaces on the control button and cap positively lock the cap in its first position when the control button is in its first position and positively lock the control button in its second position when the cap is in its second position. This arrangement insures that the cap cannot be moved from its first position to its second position until the control button has first been moved from its first position to its second position to insure proper sequencing of the selector valve and of the vehicle gear ratios.

BRIEF DESCRIPTION OF THE DRAWINGS

These and other features and advantages of the invention are provided by the preferred embodiment of the invention shown in the accompanying drawings, wherein.

DETAILED DESCRIPTION OF THE DRAWINGS

Figure 1:
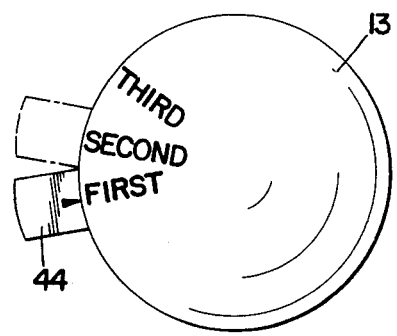
FIG. 1 is a top view of the selector valve according to this invention.
Figure 2:
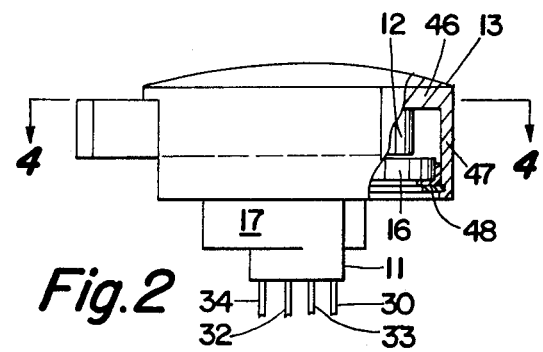
FIG. 2 is a side elevational view of the selector valve shown in FIG. 1, with portions thereof shown in cross section.
Figure 3:
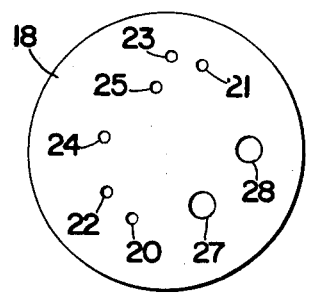
FIG. 3 is a top view of the stationary base of the selector valve, with the control button and top cap removed.

Referring now to the drawings in greater detail, FIGS. 1 and 2 show a three position air selector valve having a stationary base 11, a first movable valve plate or control button 12, and a second movable valve plate or top cap 13. The base 11 and the plates 12 and 13 may be formed of any suitable plastic or metallic material.

The stationary base 11 includes a generally flat round disk portion 16 formed integrally with a depending boss 17. The boss 17 is provided with a threaded hole extending upwardly from its bottom surface to permit threading the stationary base 11 onto the threaded top end of the motor vehicle gearshift lever.

The top of the disk portion 16 provides a smooth stationary valve surface 18. Opening to the surface 18 are first and second air pressure supply ports 20 and 21, first and second outlet ports 22 and 23, and first and second exhaust ports 24 and 25. The disk portion 16 also includes two shallow drilled holes which receive vertically extending cylindrical posts 27 and 28, the structure and purpose of which are explained in greater detail below.

The air pressure supply ports 20 and 21 are connected by internal drilled passages (not shown) in the base 11 with an air pressure supply line 30. The outlet ports 22 and 23 are connected by internal drilled passages (not shown) with outlet lines 32 and 33, respectively. The exhaust ports 24 and 25 are connected by internal drilled passages (not shown) with an exhaust line 34. The lines 30, 32, 33 and 34 each extend downwardly along the gearshift lever of the vehicle in a well known manner.

Figure 4:
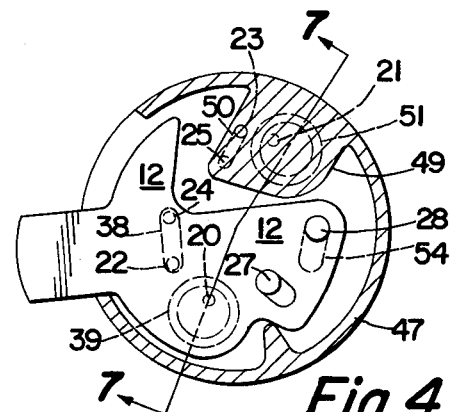
FIG. 4 is a cross sectional view taken along reference line 4—4 in FIG. 2, with the selector valve shown in the first of its three positions.
Figure 7:
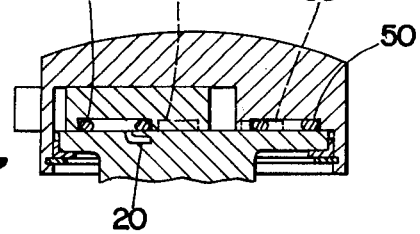
FIG. 7 is a cross sectional view taken along reference line 7—7 in FIG. 4.

The control button or first movable valve plate 12 is a generally flat plate, as best shown in FIGS. 2, 4 and 7. The bottom surface of the control button 12 includes a shallow elongated groove 38 which controls communication between the first port 22 and the exhaust port 24. The bottom surface of the control button 12 also includes a shallow annular groove which receives an elastomeric O-ring 39. The O-ring 39 cooperates with the stationary valve surface 18 and controls communication between the first outlet port 22 and the air pressure supply port 20.

A first hole extending longitudinally completely through the control button 12 receives the post 28 and provides an axis about which the control button 12 rotates between first and second positions. The control button 12 also includes an elongated arcuate slot extending longitudinally therethrough which receives the post 27. By this arrangement, the post 27 limits the rotational movement of the control button 12, and the post 28 provides a rotational axis for the control button 12 which is parallel to but offset from the rotational axis of the top cap 13, for purposes described more fully below.

The control button 12 further includes a first locking surface 42, which extends in a circumferential direction relative to a radial line drawn from the post 28 to the surface 42. The control button 12 also includes a second locking surface 43, which extends generally circumferentially relative to a radial line drawn from the rotational axis of the top cap 13 to the surface 43 when the control button 12 is in its second position. Additionally, the control button 12 includes a radially outwardly projecting gripping portion or tab 44 and a suitable detent (not shown) for releasably retaining the control button 12 in each of its two positions described below.

Referring now to FIGS. 2 and 4, the top cap 13 includes a generally disk shaped cover portion 46 and a depending skirt portion 47. A snap ring 48 holds the top cap 13 on the stationary base 11, and an annular plastic bearing having an L-shaped cross section acts between the skirt portion 47 and snap ring 48 and the stationary disk portion 16. The skirt portion 47 includes a cut out portion through which the tab 44 of the control button 12 projects.

A valving portion 49 extends radially inwardly from the skirt portion 47 and extends axially from the cover portion 46 to the valve surface 18 of the stationary base 11. The valving portion 49 inclues a shallow elongated groove 50 on its bottom surface for controlling communication between the second outlet port 23 and the exhaust port 25. The bottom surface of the valving portion 49 also includes a shallow annular groove which receives an elastomeric O-ring 51. The O-ring 51 resiliently engages the valving surface 18 of the stationary base 11 and controls communication between the second outlet port 23 and the air pressure supply port 21. A tab 52 extends radially inwardly from the skirt portion 47 at a location circumferentially spaced from the valving portion 49.

The top cap 13 also includes a shallow arcuate groove in the bottom surface of the cover portion 46 for receiving the post 28. This shallow groove in the bottom surface of the cover portion 46 is not shown in the drawings, but its location is illustrated by the dotted outline 54. The post 28 extends upwardly farther than the post 27 and into this shallow groove in the bottom surface of the cover portion 46 to limit rotational movement of the top cap 13. Additionally, a suitable detent (not shown) is provided to releasably retain the top cap 13 in each of its two positions described below.

Referring now to the operation of the selector valve shown in the drawings, FIG. 4 shows the selector valve in its first position. In the first position, the outlet ports 22 and 23 are both connected to exhaust, while the pressure supply ports 20 and 21 are closed. This is accomplished by the shallow groove 38 connecting the first outlet port 22 with the exhaust port 24, by the shallow groove 50 connecting the second outlet port 23 with the exhaust port 25, and by the O-rings 39 and 51 closing off the ports 20 and 21 respectively. In this first position, the top cap 13 cannot be rotated. This is because the post 28 prevents clockwise rotation of the top cap 13, while the tab 52 engages the locking surface 42 to prevent counterclockwise rotation of the top cap 13. This arrangement insures that the top cap 13 cannot be moved from its first position shown in FIG. 4 to its second position while the control button 12 is still in its first position shown in FIG. 4.

Figure 5:
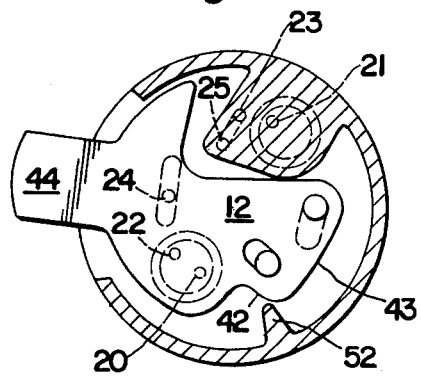
FIG. 5 is a view similar to FIG. 4 but showing the selector valve in the second of its three positions.

The intermediate position of the selector valve is shown in FIG. 5. In this position, the control button 12 has been rotated clockwise to its second position, but the top cap 13 has remained in its first position. Movement of the control button 12 is conveniently accomplished by the operator pushing on the tab 44 to rotate the control button 12 clockwise about the post 28. Over travel of the control button 12 is prevented by the post 27. Because the first locking surface 42 extends in a circumferential direction relative to the post 28 about which the control button 12 rotates, the locking surface 42 does not interfere with this movement of the control button 12.

In the intermediate position shown in FIG. 5, the first outlet port 22 is connected to the air pressure supply port 20 by the O-ring 39. However, because the top cap 13 has not been rotated, the second outlet port 23 remains connected to the exhaust port 25.

Figure 6:
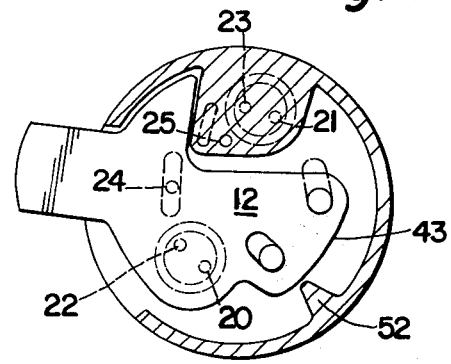
FIG. 6 is a view similar to FIG. 4 but showing the selector valve in the third of its three positions.

The final position for the selector valve is shown in FIG. 6. In this position, the control button 12 remains in its second position and the top cap 13 is rotated counterclockwise to a second position. This is accomplished by the operator grasping the outer surface of the top cap 13 and rotating the top cap 13 counterclockwise. Because the second locking surface 43 extends in a circumferential direction relative to the axis about which the top cap 13 rotates, the locking surface 43 does not interfere with this movement of the top cap 13. The extent of the counterclockwise rotation of the top cap 13 is limited by the post 28 moving in the arcuate groove in the cover portion 46 discussed above.

In this final position shown in FIG. 6, the first outlet port 22 is connected to the air pressure supply port 20 by the O-ring 39, and the second outlet port 23 is connected to the air pressure supply port 21 by the O-ring 51. In this position, the tab 52 cooperates with the second locking surface 43 to lock the control button 12 in its second position and prevent movement of the control button 12 back to its first position. This insures that the selector valve will be moved back to its intermediate position shown in FIG. 5 before the control button 12 is returned to its first position shown in FIG. 4.

What is claimed is:

1. A selector valve comprising a stationary port portion, first and second movable port portions each mounted for individual movement between two positions relative to said stationary port portion, locking means locking one of said movable port portions in one of its positions when the other of said movable port portions is in one of its positions, means secured to said first movable port portion for receiving a manual force to move said first movable port portion between said two positions, and means secured to said second movable port portion and surrounding said first movable port portion for receiving a manual force to move said second movable port portion between said two positions.

2. A selector valve according to claim 1 wherein said locking means includes engaging surfaces carried by said movable port portions.

3. A selector valve according to claim 2 including means mounting each of said movable port portions for rotational movement about an axis, and said axes are parallel to and spaced from one another.

4. A selector valve comprising a stationary port portion, first and second movable port portions each mounted for individual movement between two positions relative to said stationary port portion, locking means locking one of said movable port portions in one of its positions when the other of said movable port portions is in one of its positions, said locking means including engaging surfaces carried by said movable port portions, means mounting each of said movable port portions for rotational movement about an axis, said axes being parallel to and spaced from one another, said second movable port portion being a cup shaped member which surrounds said first movable port portion, and said engaging surfaces includiing a first pair of surfaces which are radially aligned when said movable port portions are in said one position and a second pair of surfaces which are radially aligned when said movable port portions are in their other positions.

5. A selector valve comprising a base, a generally flat valving surface on said base, first and second valve plates each mounted for movement between two positions relative to said valving surface, locking means locking said second valve plate in one of its positions when said first valve plate is in one of its positions and locking said first valve plate in its other position when second valve plate is in its other position, air pressure supply means, a first motor port in said valving surface, a second motor port in said valving surface, first valve means carried by said first valve plate isolating said supply means from said first motor port when said first valve plate is in its one position and connecting said supply means with said first motor port when said first valve plate is in its other position, and second valve means carried by said second valve plate isolating said supply means from said second motor port when said second valve plate is in its one position and connecting said supply means with said second motor port when said second valve plate is in its other position.

6. A selector valve according to claim 5 wherein said locking means includes engaging surfaces on said first and second valve plates.

7. A selector valve comprising a stationary base, means for mounting said base on a motor vehicle gearshift lever, a first valve plate adjacent said base mounted for movement between one position and another position relative to said base, a second valve plate adjacent said base and mounted for movement between one position and another position relative to said base, first locking surface means engaging and preventing movement of said second valve plate from its one position to its other position when said first valve plate and said second valve plate are both in their one position, second locking surface means engaging and preventing movement of said first valve plate from its other position to its one position when said first and second valve plates are in their other positions, tab means secured to said first valve plate for receiving a manual force to move said first valve plate between said one position and said other position, and cap means secured to said second valve plate and surrounding said first valve plate for receiving a manual force to move said second valve plate between said one position and said other position.

8. A selector valve according to claim 7 wherein said first and second locking means include cooperating surfaces on said first and second valve plates.

9. A selector valve according to claim 8 including means mounting each of said first and second valve plates for rotational movement about an axis, and said axes are parallel to and spaced from one another.

10. A selector valve comprising a stationary base, a first valve plate adjacent said base mounted for movement between one position and another position relative to said base, a second valve plate adjacent said base and mounted for movement between one position and another position relative to said base, first locking surface means engaging and preventing movement of said second valve plate from its one position to its other position when said first valve plate and said second valve plate are both in their one position, second locking surface means engaging and preventing movement of said first valve plate from its other position to its one position when said first and second valve plates are in their other positions, said first and second locking means including cooperating surfaces on said first and second valve plates, means mounting each of said first and second valve plates for rotational movement about an axis, said axes being parallel to and spaced from one another, air pressure supply means, a first motor port, a second motor port, first valve means carried by said first valve plate isolating said supply means from said first motor port when said first valve plate is in its one position and connecting said supply means with said first motor port when said first valve plate is in its other position, and second valve means carried by said second valve plate isolating said supply means from said second motor port when said second valve plate is in its one position and connecting said supply means with said second motor port when said second valve plate is in its other position.

11. A selector valve according to claim 10 wherein said second movable valve plate is a cup shaped member which surrounds said first movable valve plate, and said cooperating surfaces include a first pair of surfaces which are radially aligned when said valve plates are in said one position and a second pair of surfaces which are radially aligned when said valve plates are in their other positions.

12. A selector valve having an initial position and an intermediate position and a final position, said selector valve comprising a stationary port portion, means for mounting said stationary port portion on a motor vehicle gearshift lever, first and second movable port portions each mounted for individual movement between two positions relative to said stationary port portion, means secured to said first movable port portion for receiving a manual force to move said first movable port portion between said two positions, said first movable port portion being arranged for rotational movement in one direction to change said valve from said initial position to said intermediate position, means secured to said second movable port portion and surrounding said first movable port portion for receiving a manual force to move said second movable port portion between said two positions, and said second movable port portion being arranged for rotational movement in the opposite direction to change said valve from said intermediate position to said final position.

13. A selector valve according to claim 12 including means locking said second movable port portion in one of its positions when said first movable port portion is in one of its positions.

14. A selector valve comprising a base, said base having means for mounting said base on a motor vehicle gearshift lever, a generally flat valving surface on said base, said valving surface having air pressure supply means and first and second motor ports, a first valve plate and a second valve plate, means mounting each of said valve plates for rotational movement about an axis between one position and another position relative to said valving surface, first valve means carried by said first valve plate opening and closing communication between said supply means and said first motor port, second valve means carried by said second valve plate opening and closing communication between said supply means and said second motor port, means secured to said first valve plate for receiving a manual force to move said first valve plate between said one position and said other position, and means secured to said second valve plate and surrounding said first valve plate for receiving a manual force to move said second valve plate between said one position and said other position.

* * * * *